(12) United States Patent
Ishidoya et al.

(10) Patent No.: US 6,403,670 B1
(45) Date of Patent: Jun. 11, 2002

(54) THERMOSETTING COMPOSITION CONTAINING POLYHEMIACETAL ESTER RESIN AND POWDERY THERMOSETTING COMPOSITION

(75) Inventors: Masahiro Ishidoya, Chigasaki; Masayuki Takemoto, Yokohama; Atsushi Sato, Yokohama; Koji Sato, Yokohama; Shun Saito, Yokohama, all of (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 09/623,127

(22) PCT Filed: Dec. 10, 1999

(86) PCT No.: PCT/JP99/06964

§ 371 (c)(1),
(2), (4) Date: Oct. 13, 2000

(87) PCT Pub. No.: WO00/40641

PCT Pub. Date: Jul. 13, 2000

(30) Foreign Application Priority Data

Dec. 28, 1998 (JP) ............................. 10-376957

(51) Int. Cl.$^7$ .............................. C08F 4/00; C08L 61/00
(52) U.S. Cl. .......................... 522/6; 525/399; 525/436; 525/934; 525/446; 525/440; 525/398; 528/271; 528/272; 528/274; 528/297; 528/335; 528/336; 528/365; 528/363; 528/230; 528/364; 568/671
(58) Field of Search ................................. 525/398, 399, 525/436, 934, 446, 440; 528/271, 272, 274, 297, 335, 336, 365, 363, 364, 230; 568/671; 522/179, 180, 182, 6

(56) References Cited

U.S. PATENT DOCUMENTS 4,182,800 A    1/1980   Ringsdorf et al. .......... 525/375
5,993,909 A *  11/1999  Mizutani et al.

FOREIGN PATENT DOCUMENTS

| EP | 643112 | 3/1995 |
|---|---|---|
| EP | 774476 | 12/1996 |
| JP | 63-223015 | 9/1988 |
| JP | 4-356522 | 12/1992 |
| JP | 5-51518 | 3/1993 |
| JP | 5-86297 | 4/1993 |
| JP | 7-82351 | 3/1995 |
| JP | 7-82514 | 3/1995 |
| JP | 9-95617 | 4/1997 |
| WO | 89/10346 | 11/1989 |

* cited by examiner

Primary Examiner—Robert Dawson
Assistant Examiner—Kuo-Liang Peng
(74) Attorney, Agent, or Firm—Levy & Grandinetti

(57) ABSTRACT

The present invention relates to a thermosetting composition which comprises: (A) a polyhemiacetal ester resin having a repeat unit represented by formula (1):

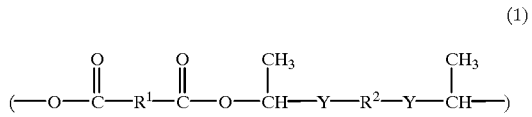

(1)

wherein $R^1$ and $R^2$ are a bivalent organic group, and Y is an oxygen atom or a sulfur atom, and (B) a compound having in the molecule two or more reactive functional groups which can form a chemical bond with the carboxyl group, and optionally, (C) an acid catalyst. The thermosetting composition gives cured products having excellent chemical properties, physical properties, adhesion, smoothness and weathering resistance at relatively lower temperatures and have excellent storage stability, and can be utilized as solvent cutback type, solventless liquid type of 100% effective component or powder thermosetting compositions.

8 Claims, No Drawings

THERMOSETTING COMPOSITION CONTAINING POLYHEMIACETAL ESTER RESIN AND POWDERY THERMOSETTING COMPOSITION

FIELD OF TECHNOLOGY

The present invention relates to a thermosetting composition comprising a polyhemiacetal ester resin. More particularly, it relates a thermosetting composition, which gives a cued product having excellent chemical properties, physical properties, adhesion, smoothness and weathering resistance and also is particularly excellent in storage stability, and is favorably utilized in, for example, coating compositions, ink, adhesives, formed articles, or insulating materials, sealing materials and resist materials applicable to color liquid crystal displays, formations of integrated circuit and packagings.

BACKGROUND TECHNOLOGY

It is generally known that thermosetting compositions have been prepared by the combination of compounds having carboxyl groups and compounds having reactive functional groups which can form chemical bonds with the carboxyl groups, such as epoxy group, oxazoline group, silanol group, alkoxysilane group, hydroxyl group, amino group, imino group, isocyanate group, blocked isocyanate group, cyclocarbonate group, vinyl ether group, vinyl thioether group, aminomethylol group, alkylated aminomethylol group, acetal group and ketal group.

Since cured products obtained by having the thermosetting compositions are excellent in chemical properties, physical properties and weathering resistance and the thermosetting compositions are widely utilized in various fields such as coatings, ink, adhesives and formed articles or insulating materials, sealing materials and resist materials applicable to color liquid crystal displays, formations of integrated circuit and packagings.

However, the reactivity between the carboxyl group and the reactive functional groups is high so that compositions which comprise compounds having carboxyl groups together with compounds having the reactive functional groups, had problems that the compositions were gelled during storage and the period suitable for pot life was short.

The inventors have already suggested a latent carboxyl compound in which carboxyl groups in the polycarboxyl compound are blocked with monofunctional vinyl ethers, and thermosetting composition comprising the latent carboxyl compound (Laid Open European Patent Application 643112).

The latent carboxyl compound regenerates free carboxyl groups at relatively low temperature and can give cured products having excellent chemical properties and physical properties. But, a part of the monofunctional vinyl ethers as the blocking agent is not trapped by the reactive functional groups in the cured product system and is volatilized out of the system. The volatilization of the blocking agent into the outside of the cured product system is safe because the monofunctional vinyl ethers itself have low toxicity, but is not preferable in the view of resource saving and decrease of effective components in the thermosetting composition.

The present invention accordingly has an object to provide thermosetting compositions which give cured products having excellent chemical properties, physical properties, adhesion, smoothness and weathering resistance at relatively lower temperatures and have excellent storage stability, and can be utilized as solvent cutback type, solventless liquid type of 100% effective component or powder thermosetting compositions.

Extensive investigations undertaken by the present inventors with the objects described above lead to a discovery that the objects can be achieved by using the polyhemiacetal ester resin in which carboxyl groups in a dicarboxyl compound are blocked by reacting the dicarboxyl compound with a two functional vinyl ether compound, i.e., divinyl ether, so that the present invention was completed based on the knowledge.

DISCLOSURE OF THE INVENTION

The present invention provides a thermosetting composition, which comprises:

(A) a polyhemiacetal ester resin having a repeat unit represented by formula (1):

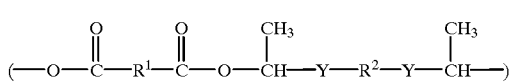

wherein $R^1$ and $R^2$ are a bivalent organic group, and Y is an oxygen atom or a sulfur atom, and (B) a compound having in the molecule two or more reactive functional groups which can form a chemical bond with the carboxyl group, and optionally, an acid catalyst.

The present invention provides the thermosetting composition as described above, wherein the reactive functional group of ingredient (B) is at least one member selected from the groups consisting of epoxy group, oxazoline group, silanol group, alkoxysilane group, hydroxyl group, amino group, imino group, isocyanate group, blocked isocyanate group cyclocarbonate group, vinyl ether group, vinyl thioether group, aminomethylol group, alkylated aminomethylol group, acetal group and ketal group.

Also, the present invention provides the thermosetting composition as described above, wherein the acid catalyst of ingredient (C) is a thermal latent acid catalyst which is activated during curing of the composition by heating.

Further, present invention provides the thermosetting composition as described above, wherein the acid catalyst of ingredient (C) contains a compound which generates an acid by irradiating with light.

Furthermore, the present invention provides a powder thermosetting composition of the thermosetting composition as described above.

Other and further objects, features and advantages of the invention will appear more fully from the following description.

PREFERABLE EMBODIMENT FOR PRACTICING THE INVENTION

The polyhemiacetal ester resin as the indispensable ingredient of the present invention is composed of the repeat unit represented by formula (1) as described above. In the formula, $R^1$ and $R^2$ are a bivalent organic group and same or different.

The organic groups include, for example, alkylene groups such as trimethylene, cycloalkylene groups such as cyclohexane remained groups in which two hydrogen atoms are removed from cyclohexane, alkenylene groups such as vinylene, polyoxyalkylene groups such as polyoxyethylene and polyoxypropylene, cycloalkenylene groups such as cyclohexene remained group in which two hydrogen atoms are removed from cyclohexene, bivalent aromatic remained groups such as phenylene, biphenylene, naphthylene and organic groups represented by the following formula (2).

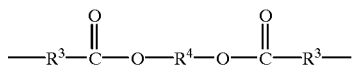

(2)

Wherein $R^3$ and $R^4$ are a bivalent organic group that the number of the total carbon atoms in the formula (2) is 1 to 25. Both terminated $R^3$ are same or different.

The organic groups can be substituted by one or more of halogen atoms such as chlorine atom, bromine atom and iodine atom, and other substituents.

The preferable organic groups are alkylene groups, cycloalkylene groups such as cyclohexane remained group, bivalent aromatic remained groups and organic groups represented by formula (2).

The alkylene group is a straight chain or branched chain bivalent hydrocarbon group and preferably an alkylene group having 1 to 10 carbon atoms. Examples of the alkylene groups include methylene, ethylene, trimethylene, methyl methylene, ethyl methylene, methyl ethylene, ethyl ethylene, 2-methyl trimethylene, tetramethylene, 1-methyl trimethylene, pentamethylene, 2,2-dimthyl trimethylene, 1-methyl pentamethylene, 2-methyl pentamethylene 3-methyl pentamethylene, hexamethylene, heptamethylene, octamethylene, nonamethylene and decamethylene.

The cycloalkylene groups include, for example, cyclopentane remained groups, cyclohexane remained groups, cycloheptane remained groups, groups in which one or two bond hands thereof is bonded with the above-mentioned alkylene group such as methylene and ethylene, and an alkyl substitution products thereof.

The alkenylene group is a straight chain or a branched chain bivalent hydrocarbon group and preferably includes alkenylene groups having 1 to 10 carbon atoms. Examples of the alkenylene groups include cis-vinylene, trans-vinylene, propenylene, 2-butenylene, 1-methyl propenylene, 3-methyl-2-butenylene, 3,3-dimethyl propenylene, 2-pentenylene, 3-methyl-2-butenylene, 3-methyl-3-butenylene, 2-hexenylene, 3-heptenylene, 4-octenylene, 3-nonenylene and 3-decenylene.

The polyoxyalkylene group include for example polyoxyethylene, polyoxypropylene and polyoxybutylene.

The cycloalkenylene group include, for example, cyclopentene remained group, cyclohexene remained group, cycloheptene remained group, and groups in which one or two bond hands thereof are bonded with the above-mentioned alkylene group such as methylene and ethylene, and alkyl substitution products thereof. Preferable cycloalkenylene groups include cyclopentene remained group and cyclohexene remained group.

The bivalent aromatic remained group is a remained group in which two hydrogen atoms are removed from the aromatic compound. Preferable examples of the bivalent aromatic remained group include phenylene, biphenylene, naphthylene, oxonaphthylene, bivalent anthracene remained group, bivalent anthraquinone remained group, alkane diphenylene, carbonyl diphenylene, sulfonyl diphenylene, and alkyl substitution products thereof, and groups in which one or two bond hands thereof are bonded with the above-mentioned alkylene group, and substitution products thereof with halogen atom such as chlorine atom, bromine atom and iodine atom.

The preferable aromatic group includes phenylene naphthylene, alkanediphenylene, oxonaphthylene remained group and alkyl substitution products thereof.

The alkyl groups substituted to the cycloalkyl ring, the cycloalkyenyl ring or the aromatic ring, include methyl, ethyl, n-propyl, isopropyl, n-butyl, isobutyl, tert-butyl, n-pentyl, isopentyl, neopentyl, tert-pentyl, 2-methylbutyl, n-hexyl, isohexyl, 3-methylpentyl, ethylbutyl, n-heptyl, 2-methylhexyl, n-octyl, 3-methylheptyl, n-nonyl, methyloctyl, ethylheptyl, n-decyl, n-undecyl, n-dodecyl, n-tetradecyl, n-heptadecyl and n-octadecyl and cyclohexyl. Preferable alkyl groups are alkyl groups of 1 to 8 carbon atoms. Examples of the preferable alkyl groups are methyl, ethyl, n-propyl and n-octyl. The alkyl group substituted to the cycloalkyl ring, the cycloalkyenyl ring or the aromatic ring can be one or not less than two.

The phenylenes and alkyl substitution products thereof include o-phenylene, m-phenylene, p-phenylene, all isomers of tolylene such as 4-methyl-o-phenylene, 5-methyl-m-phenylene and 5-methyl-p-phenylene, all isomers of xylylene such as 3,4-dimethyl-o-phenylene, 4,5-dimethyl-m-phenylene, 2,5 -dimethyl-p-phenylene, all isomers of ethyl phenylene such as 4-ethyl-o-phenylene, 4-ethyl-m-phenylene and 2-ethyl-p-phenylene, all isomers of n-propyl phenylene, all isomers of isopropyl phenylene, all isomers of n-butyl phenylene, all isomers of t-butyl phenylene, all isomers of amyl phenylene, all isomers of hexyl phenylene and all isomers of nonyl phenylene. Preferable examples of phenylene and alkyl substitution products thereof are o-phenylene, m-phenylene, p-phenylene, 4-methyl-o-phenylene, 5-methyl-m-phenylene and 5-methyl-p-phenylene.

The naphthylenes and alkyl substitution products thereof include 1,2-naphtylene, 1,3-naphthylene, 1,4-naphthylene, 1,5-naphthylene, 1,6-naphthylene, 1,7-naphthylene, 1,8-naphthylene, 2,3-naphthylene, 2,6-naphthylene, 2,7-naphthylene and all isomers of methyl substitution products thereof, all isomers of dimethyl substitution products thereof, all isomers of ethyl substitution products thereof, all isomers of isopropyl substitution products thereof and all isomers of n-butyl substitution products thereof. Preferable examples of the naphthylenes and the alkyl substitution products are 1,2-naphthylene, 1,3-naphthylene, 1,4-naphthylene, 1,5-naphthylene, 1,6-naphthylene, 1,7-naphthylene, 1,8-naphthylene, 2,3-naphthylene, 2,6-naphthylene, 2,7-naphthylene.

The oxonaphthylenes and alkyl substitution products thereof include 1,2-naphthoquinone-5,8 position remained group, 1,4-naphthoquinone-5,8 position remained group, 2,6-naphthoquinone-5,8 position remained group and all isomers of methyl substitution products thereof, all isomers of ethyl substitution products thereof all isomers of isopropyl substitution products thereof and all isomers of n-butyl substitution products thereof. Preferable examples of the oxonaphthylene and alkyl substitution products thereof are 1,2-naphthoquinone-5,8 position remained group, 1,4-naphthoquinone-5,8 position remained group and 2,6-naphthoquinone-5,8 position remained group.

The bivalent anthracene remained group is a remained group in which two hydrogen atoms are removed from the anthracene. Examples of anthracene remained group and alkyl substitution products thereof include 1,2-anthracene remained group, 1,3-anthracene remained group, 1,4-anthracene remained group, 1,5-anthracene remained group, 1,6-anthracene remained group, 1,7-anthracene remained group, 1,8-anthracene remained group, 2,3-anthracene remained group, 2,6-anthracene remained group, 2,7- anthracene remained group, and all isomers of methyl substitution products thereof, all isomers of ethyl substitution products thereof, all isomers of isopropyl substitution products thereof and all isomers of n-butyl substitution products thereof. Preferable examples of anthracene remained group and alkyl substitution products thereof are 1,2-anthracene remained group, 1,3-anthracene remained group, 1,4-anthracene remained group, 1,5-anthracene remained group, 1,6-anthracene remained group, 1,7-anthracene remained group, 1,8-anthracene remained group, 2,3-anthracene remained group, 2,6-anthracene remained group and 2,7-anthracene remained group.

The bivalent anthraquinone remained group is a remained group in which two hydrogen atoms are removed from the anthraquinone. Examples of anthraquinone remained group and alkyl substitution products thereof include 9,10-anthraquinone-5,8 position remained group, 9,10-anthraquinone-1,5 position remained group, 1,2-anthraquinone-6,9 position remained group, 1,4-anthraquinone-6,9 position remained group, and all isomers of methyl substitution products thereof, all isomers of ethyl substitution products thereof, all isomers of isopropyl substitution products thereof and all isomers of n-butyl substitution products thereof. Preferable examples of anthraquinone remained group and alkyl substitution products thereof are 9,10-anthraquinone-5,8 position remained group, 9,10-anthraquinone-1,5 position remained group, 1,2-anthraquinone-6,9 position remained group and 1,4-anthraquinone-6,9 position remained group.

The alkane diphenylene and alkyl substitution products thereof include propane-2,2-diphenylene, 2-methylpropane-3,3-diphenylene, methylcyclohexylmethane-diphenylene, and all isomers of methyl substitution products thereof, all isomers of ethyl substitution products thereof, all isomers of isopropyl substitution products thereof and all isomers of n-butyl substitution products thereof. Preferable example of alkane diphenylene and alkyl substitution products thereof is propane-2,2-diphenylene.

The sulfonyl diphenylene and alkyl substitution products thereof include sulfonyl diphenylene, and all isomers of methyl substitution products thereof, all isomers of ethyl substitution products thereof, all isomers of isopropyl substitution products thereof and all isomers of n-butyl substitution products thereof. Preferable example of sulfonyl diphenylene and alkyl substitution products thereof is sulfonyl diphenylene.

In formula (2), $R^3$ and $R^4$ are a bivalent organic group. In formula (2), $R^3$ and $R^4$ are same or different. Examples of $R^3$ and $R^4$ are the same as the organic groups in above-mentioned $R^1$ and $R^2$ other than the organic group of formula (2).

Also, two Y in formula (1) are same or different.

The polyhemiacetal ester resin has at least one, preferably two or more, more preferably five or more, most preferably 8 or more repeat units represented by formula (1).

The polyhemiacetal ester resin as indispensable ingredient in the present invention contains only one or two members of the repeat units and further the other repeat units other than the repeat units of formula (1).

The other repeat units contained in the polyhemiacetal ester resin used in the present invention include a repeat unit that composes a polyester resin and a repeat unit that composes a polyurethane resin.

The content ratio of the repeat unit of formula (1) in the polyhemiacetal ester resin is preferably 10 to 100 percents by weight, more preferably 30 to 100 percents by weight.

The weight average molecular weight of the polyhemiacetal ester resin is not particularly limited, but generally in the range of 500 to 100,000, preferably in the range of 900 to 50,000.

The polyhemiacetal ester resin used in the present invention, which contains the repeat unit represented by formula (1), can be easily obtained by adduct reacting dicarboxylic acid represented by formula (3)

(3)

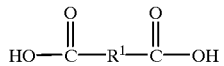

wherein $R^1$ is a bivalent organic group, with divinyl ether or divinyl thioether represented by formula (4)

$$CH_2=CH-Y-R^2-Y-CH=CH_2 \quad (4)$$

wherein $R^2$ is a bivalent organic group, and Y is an oxygen atom or a sulfur atom.

The dicarboxylic acid represented by formula (3) used in preparation of polyhemiacetal ester resin, which is used in the present invention, includes aliphatic dicarboxylic acids of 2 to 30 carbons such as maleic acid, fumaric acid, mesaconic acid, citraconic acid, itaconic acid, chlorinated maleic acid, hetto acid, succinic acid, adipic acid, azelaic acid, sebacic acid and decamethylene dicarboxylic acid, aromatic dicarboxylic acids such as phthalic acid, isophthalic acid, terephthalic acid, dichloro phthalic acid, dichloro isophthalic acid, tetrachloro phthalic acid, tetrachloro isophthalic acid and tetrachloro terephthalic acid, alicyclic dicarboxylic acids such as tetrahydrophthalic acid, hexahydrophthalic acid methyl hexahydrophthalic acid, hexahydroisophthalic acid and hexahydroterephthalic acid, and dicarboxylic acids in which carboxyl group is introduced to the bivalent remained group of $R^1$ or $R^2$ in the above-mentioned bivalent organic groups.

Also, instead of the dicarboxylic acid, half-ester of dicarboxylic acid obtained by adduct reacting 1 mole of diol with 2 mole of acid anhydride can be utilized. The diol includes ethylene glycol, diethylene glycol, 1,2-propylene glycol, 1,3-propylene glycol, 1,3-butanediol, 1,4-butanediol, 2,3-butanediol, 1,6-hexanediol, pentanediol, dimethyl butanediol, hydrogenated bisphenol A, bisphenol A, neopentyl glycol, 1,8-octanediol,1,4-cyclohexanediol,1,4-cyclohexanedimethanol and 2-methyl-1,3-propanediol. The acid anhydride used in the half-ester of dicarboxylic acid includes acid anhydrides of dicarboxylic acids such as succinic acid, glutaric acid, phthalic acid, maleic acid, dichloro phthalic acid, tetrachloro phthalic acid, tetrahydrophthalic acid, hexahydrophthalic acid and methyl hexahydrophthalic acid. As the other half-ester of dicarboxylic acid, any compounds having a dicarboxylic acid structure, such as terminated dicarboxylic acid having polyester structure or a polybutadiene structure can be utilized.

Further, examples of the divinyl ether compound represented by formula (4) used in preparation of polyhemiacetal ester resin, which is used in the present invention, include trimethylene glycol divinyl ether, 1,4-bisvinyloxymethyl cyclohexene, ethylene glycol divinyl ether, polyethylene glycol divinyl ether, butanediol divinyl ether, pentanediol divinyl ether, hexanediol divinyl ether, 1,4-cyclohexandimethanol divinyl ether, 1,4-benzene divinyl ether, bisphenol A divinyl ether, bisphenol F divinyl ether, and divinyl thioethers corresponding to the divinyl ethers and 2,2-bis(vinylthio)propane, and divinyl ethers or divinyl thioethers in which divinyl ether group or divinyl thioether group is introduced to the bivalent remained group of $R^1$ or $R^2$ in the above-mentioned bivalent organic groups.

In the polyhemiacetal ester resin used in the present invention, the dicarboxylic acid represented by formula (3)

or the half-ester and the divinyl ether compound represented by formula (4) can be respectively used in plural members. Also, mono functional carboxylic acid compounds, phenols or mono alcohols can be used together with the dicarboxylic acid compound or the half-ester to control the molecular weight and the cured film properties. Such compounds include synthetic resin acid of 1 to 20 carbons, natural aliphatic acid of 10 to 32 carbons, rosin, phenols of 1 to 25 carbons and alcohols.

The reaction of the dicarboxylic acid or the half-ester and divinyl ether compound is usually conducted in solventless or proper solvent at the temperature in the range of room temperature to 200° C.

Ingredient (B) used in the thermosetting composition of the present invention is a compound having in the molecule two or more, preferably two to 50 reactive functional groups which can react free carboxylic groups regenerated by heating ingredient (A) to form chemical bonds.

The reactive functional groups are not particularly limited, and include preferably epoxy group, oxazoline group, silanol group, alkoxysilane group, hydroxyl group, amino group, imino group, isocyanate group, blocked isocyanate group cyclocarbonate group, vinyl ether group, vinyl thioether group, aminomethylol group, alkylated aminomethylol group, acetal group and ketal group. The reactive functional groups are one or not less than 2 members.

Examples of such compounds of ingredient (B) are bisphenol type epoxy resin, phenol novolak type epoxy resin, phenol cresol type epoxy resin, biphenyl type epoxy resin, cyclopentadiene type epoxy resin, alicyclic epoxy resin, homopolymers and copolymers of glycidyl acrylate, glycidyl methacrylate, 3,4-epoxycyclohexylmethyl acrylate, 3,4-epoxycyclohexylmethyl methacrylate, copolymers of glycidyl allyl ether, vinylidene fluoride and vinyl ether, polyglycidyl compounds obtained by the reaction of epichlorohydrine with polycarboxylic acids or polyols and other like compounds, epoxy group-containing silicone oils, such as KF-101, KF-103, KF-105, X-22-169AS (all trade names, products of Shin-Etsu chemical Co., LTD.); oxazoline group-containing compounds, such as oxazoline compounds having an oxazoline ring connected to an alkyl chain like 1,2-bis(2-oxazolinyl-2) ethane, 1,4-bis(2-oxazolinyl-2) butane, 1,6-bis(2-oxazolinyl-2)hexane, 1,8-bis(2-oxazolinyl-2)octane, 1,4-bis(2-oxazolinyl-2)cyclohexane, oxazoline compounds having two oxazoline rings connected to an aromatic ring like benzene ring like 1,2-bis(2-oxazolinyl-2)benzene, 1,3-bis(2-oxazolinyl-2)benzene, 1,4-bis(2-oxazolinyl-2)benzene, 5,5'-dimethyl-2,2'-bis(2-oxazolinyl-2)benzene, 4,4,4',4'-tetramethyl-2,2'-bis(2-oxazolinyl-2)benzene, 1,2-bis(5-methyl-2-oxazolinyl-2) benzene, 1,3-bis(5-methyl-2-oxazolinyl-2)benzene, 1,4-bis(5-methyl-2-oxazolinyl-2)benzene, bis(2-oxazoline) compounds like 2,2'-bis(2-oxazoline), 2,2'-bis(4-methyl-2-oxazoline) and 2,2'-bis(5-methyl-2-oxazoline), polyfunctional oxazoline compounds obtained by the reaction of hydroxy alkyl-2-oxazoline with the polyisocyanate compounds described above, compounds having oxazoline group like homopolymers or copolymers of 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline, commercial oxazoline group-containing compounds like CX-RS-1200, CX-RS-3200 (all products of Nippon Shokubai Co., LTD.) and the like other compounds having oxazoline group; compounds having silanol group or alkoxysilane group, such as condensation products of compounds represented by formula (5):

$$(R^9)_n Si(OR^{10})_{4-n} \qquad (5)$$

wherein $R^9$ and $R^{10}$ are each selected from the group consisting of alkyl group of 1 to 18 carbon atoms and aryl group of 1 to 18 carbon atoms and n is 0, 1 or 2,homopolymers and copolymers of α,β-unsaturated silane compounds, like acryloyloxypropyl trimethoxysilane, methacryloyloxypropyl trimethoxysilane, methacryloyloxypropyl tri-n-butoxysilane, compounds having silanol group or alkoxysilane group like hydrolysis products of these compounds; compounds having hydroxyl group, such as aliphatic polyols, phenols, polyalkyleneoxyglycols homopolymers and copolymers of α,β-unsaturated compounds, like 2-hydroxyethyl acrylates, 2-hydroxyethyl methacrylates, 2-hydroxypropyl acrylate, 2-hydroxypropyl methacrylate, addition products of ε-caprolactone with these polyols; compounds having amino group, such as aliphatic diamino compounds, aromatic diamino compounds, polyamino compounds, polyamino compounds prepared by cyanoethylation and reduction of the polyols; compounds having imino group, such as aliphatic polyimino compounds and aromatic polyimino compounds; compounds having isocyanate group, such as p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene-bis (phenylisocyanate), lysinemethyl esterdiisocyanate, bis-(isocyanatoethyl)fumarate, isophorone diisocyanate, methylcyclohexyl diisocyanate, 2-isocyanatoethyl-2,6-diisocyanatehexanoate, biuret derivatives and isocyanurate derivatives of these isocyanates and addition products of these isocyanates with the polyols; compounds having blocked isocyanate group, such as compounds prepared by blocking the compounds having isocyanate group with phenols, lactams, active methylenes, alcohols, acid amides, imides, amines, imidazoles, ureas, imines, or oximes; compounds having cyclocarbonate group, such as homopolymers and copolymers of 3-acryloyloxypropylene carbonate or 3-methacryloyloxypropylene carbonate, compounds having polyfunctional cyclocarbonate groups prepared by the reaction of the compounds having epoxy group with carbon dioxide; compounds having vinyl ether group or vinyl thioether group, such as polyfunctional vinyl ether compounds prepared by the reaction of the compounds having polyfunctional hydroxyl group with halogenated alkyl vinyl ethers, polyvinyl ethers prepared by the reaction of hydroxyalkyl vinyl ethers with compounds having the polyfunctional carboxyl group or with the polyisocyanate compounds, vinyl ethers like copolymer of vinyloxyalkyl acrylates or vinyloxyalkyl methacrylates with α,β-unsaturated compounds, and vinyl thioethers corresponding to the vinyl ethers; compounds having aminomethylol group or alkylated aminomethylol group, such as melamine formaldehyde resins, glycolyl formaldehyde resins, urea formaldehyde resins, homopolymers and copolymers of α,β-unsaturated compounds having aminomethylol group or alkylated aminomethylol group; acetal group-containing compounds or ketal group-containing compounds, such as polyfunctional acetal compounds prepared by the reaction of polyfunctional ketones, polyfunctional aldehydes, or the polyfunctional vinyl ether compounds described above with alcohols or orthoacid esters, condensation products of the compounds with polyol compounds, homopolymers and copolymers of addition products of the vinyloxyalkyl acrylate or vinyloxyalkyl methacrylate with alcohols or orthoacid esters.

Suitable examples of $R^9$ and $R^{10}$ in the formula (5) include the same as the Examples of $R^1$ of the formula (1).

The content ratio of ingredient (A) and ingredient (B) is preferably controlled to be 0.2:1.0 to 1.0:0.2 in equivalent ratio of the blocked carboxylic group of ingredient (A) and the reactive functional group of ingredient (B) in the thermosetting composition of the present invention. The polyhemiacetal ester resin of ingredient (A) can regenerate original free carboxylic group easily by only heating, but faster in the presence of acid catalyst (C).

As acid catalyst (C), Bronsted acids or Lewis bases can be utilized. If it is final purpose to obtain the solventless liquid type of 100% effective component thermosetting composition, preferable acid catalysts are thermal latent acid catalysts which indicate activity for the first time by heating and/or compounds which generate acids by irradiation with light. The thermal latent acid catalyst which indicate activity for the first time by heating include compounds prepared by neutralizing Bronsted acids with Lewis bases, compounds prepared by neutralizing Lewis acids with Lewis bases, mixtures of Lewis acids and trialkyl phosphate, esters of sulfonic acids, esters of phosphoric acid, onium compounds, compounds comprising (i) a epoxy group-containing compound, (ii) a sulfur atom-containing compound and (iii) a Lewis acid, or these compounds and (iv) a carboxyl compound and or a carboxylic acid anhydride compound.

The compounds prepared by neutralizing Bronsted acids with Lewis bases include, for example, compounds prepared by neutralizing halogenocarboxylic acids, sulfonic acids, monoesters of sulfuric acid, monoesters and diesters of phosphoric acid, esters of polyphosphoric acid, or monoesters and diesters of boric acid with amines, such as ammonia, monoethylamine, triethylamine, pyridine, piperidine, aniline, morpholine, cyclohexylamine, n-butylamine, monoethanolamine, diethanol amine and triethanol amine; or with trialkylphosphine, triarylphosphine, trialkylphosphite, or triarylphosphite, and Nacure 2500X, Nacure X-47-110, Nacure 3525 and Nacure 5225 (trade names, products of King Industry Co., LTD) as the commercial acid-base blocked catalysts.

The compounds prepared by neutralizing Lewis acids with Lewis bases include, for example, compounds prepared by neutralizing Lewis acids such as $BF_3$, $FeCl_3$, $SnCl_4$, $AlCl_3$, $ZnCl_2$ and metal soaps like zinc 2-ethylhexylate, and tin 2-ethylhexylate with Lewis bases described above and mixtures of Lewis acids described above and trialkylphosphate, The esters of sulfonic acids include compounds represented by formula (6):

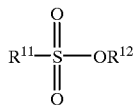

(6)

wherein $R^{11}$ is phenyl group, substituted phenyl group, naphthyl group, substituted naphthyl group or alkyl group and $R^{12}$ is alkyl group, alkenyl group, aryl group, alkaryl group, alkanol group, saturated or unsaturated cycloalkyl group, or saturated or unsaturated hydroxycycloalkyl group of 3 to 18 carbon atoms, which are bonded with sulfonyloxy group through a primary or secondary carbon atom. Examples of the above mentioned compounds are esters of sulfonic acids such as methane sulfonic acid, ethane sulfonic acid, benzene sulfonic acid, dodecylbenzene sulfonic acid, naphthalene sulfonic acid and nonylnaphthalene sulfonic acid with primary alcohols such as n-propanol, n-butanol, n-hexanol and n-octanol, or secondary alcohols such as isopropanol, 2-butanol, 2-hexanol, 2-octanol and cyclohexanol, and β-hydroxyalkylsulfonic esters prepared by the reaction of the sulfonic acid with compounds containing oxirane group.

The esters of phosphoric acid include, for example, compounds represented by formula (7):

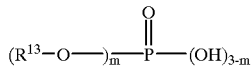

(7)

wherein $R^{13}$ is a group of 3 to 10 carbon atoms selected from the group consisting of alkyl group, cycloalkyl group and aryl group and m is 1 or 2. Examples of the above-mentioned compounds are monoesters and diesters of phosphoric acid with primary alcohols such as n-propanol, n-butanol, n-hexanol, n-octanol and 2-ethylhexanol, or secondary alcohols such as isopropanol, 2-butanol, 2-hexanol, 2-octanol and cyclohexanol.

The onium compounds include, for example, compounds represented by formulas (8) to (11):

(8)

(9)

(10)

and

(11)

wherein $R^{14}$ is a group of 1 to 12 carbon atoms selected from the group consisting of alkyl group, alkenyl group, aryl group, alkaryl group, aklanol group and cycloalkyl group, two $R^{14}$ groups can be bonded together to form a heterocyclic ring in which N, P, O or S is the hetero atom, $R^{15}$ is a hydrogen atom or a group of 1 to 12 carbon atoms selected from the group consisting of alkyl group, alkenyl group, aryl group and alkaryl group and $X^-$ is selected from the group consisting of $SbF_6^-$, $AsF_6^-$, $PF_6^-$ and $BF_4^-$.

The thermal latent acid catalyst can be utilized singly or in combination of two or more members.

The amount of Bronsted acids, Lewis bases or thermal latent acid catalyst is not particularly limited, but is preferably in the range of 0.01 to 10 percent by weight to total solid content of the thermosetting composition comprising the polyhemiacetal ester resin of the present invention. If the amount of the acid catalyst is less than 0.01 percent by weight, catalyst effect is not sufficiently exerted. If the amount of the acid catalyst is more than 10 percent by weight, it is not preferable because the final obtained cured product may be colored and the moisture resistance may be decreased.

The compounds which generate acid by irradiating with light include triaryl sulfonium salt, diaryl iodonium salt, 2,6-dinitrobenzyl-p-toluene sulfonate and α-p-toluene sulfonyloxy acetophenone. As commercial sulfonium salts, SANEID SI-60L, SANEID SI-80L and SANEID SI-100L (all trade names, produced by SANSIN CHEMICAL INDUSTIES CO.LTD) can be utilized.

The compounds, which generate acid by irradiating with light, can be utilized singly or in combination of two or more members. The amount of the compound generating acid by irradiating with light is preferably in the range of 0.01 to 50 percent by weight, more preferably in the range of 0.1 to 30 percent by weight to total solid content of the thermosetting composition comprising the polyhemiacetal ester resin of the present invention. If the amount of the catalyst is less than 0.01 percent by weight, catalyst effect is not sufficiently exerted. If the amount of the catalyst is more than 50 percent by weight, further increasing effect can be not expected.

The time and temperature required to cure the thermosetting composition comprising the polyhemiacetal ester resin of the present invention is different depending on the temperature at which free carboxyl group is regenerated from the polyhemiacetal ester resin represented by formula (1), the kind of the reactive functional group, existence or inexistence of the acid catalyst and the kind of the acid catalyst. In general, curing is completed by heating at the temperatures in the range from 50 to 300° C. for the time in the range from 2 minutes to 10 hours.

In the curing reaction of the thermosetting composition comprising the polyhemiacetal ester resin of the present invention, rigid three dimensional crosslinking structure is formed by heat dissociation reaction of the polyhemiacetal ester resin to dicarboxyl compound and divinyl ether compound and reaction of the generated dicarboxyl compound and the reactive functional group in ingredient (B), which can form chemical bonds with the carboxyl groups. The divinyl ether compound generated in the curing reaction is different from monofunctional vinyl ether which is disclosed in the above-mentioned prior art (Laid Open European Patent Application 643112), and is a compound having high boiling point because of increasing of one in the vinyl group number. Further, since the divinyl ether compound forms chemical bonds with hydroxyl groups generated by reacting the carboxyl groups with the epoxy groups and the other functional groups because of two functionality, the divinyl ether compound can prevent to volatilize out of the cured product system. The boiling point of the divinyl ether compound is preferably not less than 100° C., more preferably not less than 150° C.

The thermosetting composition comprising the polyhemiacetal ester resin of the present invention can be formulated without other ingredients or with various additives such as coloring pigments, extender pigments, conductive fillers, photosensitive resins, ultraviolet light absorbents, antioxidants and flow controlling agents, and solvents according to needs and can be utilized in various uses applicable the curing ability, such as coating compositions, ink, adhesives, formed articles, or insulating materials, sealing materials and resist materials applicable to color liquid crystal displays, formations of integrated circuit and packagings.

Examples of pigments include various pigments such as organic pigments and inorganic pigments, and, for example, surface treated metallic pigments such as aluminium, copper, brass, bronze, stainless steel, silver, nickel, iron oxides of mica form, metallic powders of flake form and mica coated with titanium dioxide or iron oxides; inorganic pigments such as titanium dioxide, iron oxides,yellow iron oxide and carbon black; organic pigments such as phthalocyanine blue, phthalocyanine green and quinacridone red pigments; and extender pigments such as precipitated barium sulfate, clay, silica and talc.

If the pigment is formulated in the thermosetting compositions, the content of the pigment is preferably 300 or below parts by weight, more preferably 100 or below parts by weight based on 100 parts by weight of the total weight of the nonvolatile matter of ingredient (A) and ingredient (B). If the pigment is formulated, the amount of the pigment is preferably at least 0.1 parts by weight.

The thermosetting composition of the present invention can be in various forms such as solvent cutback type, solventless liquid type of 100% effective component and powder type, according to the above-mentioned uses and purposes.

The solvents used in the solvent cutback type thermosetting composition, include aromatic hydrocarbon solvents such as benzene,xylene and toluene, alicyclic hydrocarbon solvents such as cyclohexanone, aliphatic hydrocarbon solvents such as hexane and heptane, ether solvents such as diphenyl ether and dibutyl ether, ketone solvents such as acetone, methyl ethyl ketone, methyl isobutyl ketone and cyclohexanone, ester solvents such as ethyl acetate and butyl acetate and amide solvents such as dimethyl acetamide and dimethyl formamide.

The content of the solvent used in the solvent cutback type thermosetting composition, is not particularly limited, but is preferably 5 to 90 percents by weight, more preferably 10 to 60 percent by weight to the total weight of the thermosetting composition.

If the thermosetting composition of the present invention is the powder type, the resin softening point of ingredient (A) and ingredient (B) is preferably in the range of 30 to 200° C. If the resin softening point is less than 30° C., it is not preferable because blocking may be caused during storage so that the stability of the thermosetting composition is decreased. On the other hand, if the resin softening point is more than 200° C., it is not preferable because flowability during curing is lost so that smoothness is decreased.

The powder thermosetting composition of the present invention have excellent smoothness and throwing power compared with conventional powder thermosetting compositions, because of flowability by heat melt of the used resin and further viscosity decrease effect caused by decrease of molecular weight through cutting the main chain of the polyhemiacetal ester resin of ingredient (A).

If the thermosetting composition of the present invention is utilized as adhesive or sealing material, the thermosetting composition can be used in all forms of liquid, solid and film. Also, the thermosetting composition of the present invention is applicable to a use that after applying the thermosetting composition on a plastic film or a metallic foil, volatile components such as solvents are removed by preliminary drying and a sheet is formed in what is called "B-stage", and then the sheet is adhered to the other substrate by lamination treatment.

Plastic films applicable to such uses include polypropylene, polyethylene terephthalate, polyfluorinated vinylidene and polyimide films. Also, the usable metallic foil includes iron, stainless, aluminum, copper and titanium foil.

If the thermosetting composition of the present invention is utilized as photosensitive resist, the above-mentioned compound which generates an acid by irradiating with light can be utilized. The irradiating lights include visible light, ultraviolet light, X ray and electron beam. After exposure, positive or negative pattern can be obtained by developing with developer such as alkali aqueous solution and organic solvent. And then, a patterned cured product can be obtained by above-mentioned heating, that is, heating at temperature in the range of 50 to 200° C. for 2 minutes to 10 hours.

EXAMPLES

The invention is explained in detail with reference to the following Examples; however, these Examples are intended to illustrate the invention and are not to be construed to limit the scope of the invention.

Preparation Examples 1 to 2

Preparation of Dicarboxyl Compound Half-ester a-1 and a-2

Into a four-necked flask equipped with a thermometer, a reflux condenser, a nitrogen gas introducing tube and a stirrer, the mixture of the components shown in Table 1 was charged and the mixture was kept stirring at 60° C. until the mixture became homogeneous. Next, the mixture was heated to 140° C. and the reaction was continued while the same temperature was kept. Measuring a half acid value and a total acid value of the resin, the reaction was finished at the time that the reaction yield became 98 or more percents. After finishing the reaction, the solvent was removed from the reaction product under reduced pressure. Thus, dicarboxyl compound half-ester a-1 and a-2 of the half-ester compound obtained by reacting diol and acid anhydride were prepared.

TABLE 1

| Preparation Examples<br>dicarboxyl compound half-ester | | 1<br>a-1 | 2<br>a-2 |
|---|---|---|---|
| Raw material components (weight parts) | 1,4-butanediol | 15.8 | — |
| | neopentyl glycol | — | 18.2 |
| | hexahydrophthalic acid anhydride | 54.2 | — |
| | phthalic acid anhydride | — | 51.8 |
| | methyl isobutyl ketone | 30.0 | 30.0 |

Preparation Examples 3 to 9

Preparation of Polyhemiacetal Ester Resins A-1 to A-7

Into the same reaction vessel used in Preparation Example 1, the monomer components shown in Table 2 were charged and the mixture was kept stirring at 60° C. until the mixture became homogeneous. Next, the mixture was heated to 120° C. and the reaction was continued while the same temperature was kept. The reaction was finished when acid value of the mixture decreased to a value of not more than 10 or the infrared spectrum of 3543 $cm^{-1}$ based on the hydroxyl group in the carboxyl group was lost. The xylene solutions of polyhemiacetal ester resins A-1 to A-7 having characteristic values shown in Table 2 were prepared.

Preparation Example 10

Preparation of Polyhemiacetal Ester Resin A-8

Into the same reaction vessel used in Preparation Example 1, 1,4-cyclohexanedimethylol (CHDM) and 4-methyl hexahydro phthalic acid anhydride (MHHPA) in the amount shown in Table 2 were charged and the mixture was reacted at 140° C. for 2 hours. Next, the mixture was cooled to 120° C., and 1,4-cyclohexane dimethanol divinyl ether (CHDVE) in the amount shown in Table 2 was dropped into the mixture to continue the reaction while the temperature was kept at 120 to 130° C. The reaction was finished when acid value of the mixture decreased to a value of 9.5. Solid polyhemiacetal ester resins A-8 having a weight average molecular weight of 8,795 and a resin softening temperature of 54° C. was prepared.

TABLE 2

| | Preparation Examples | | | | | | | |
|---|---|---|---|---|---|---|---|---|
| | 3 | 4 | 5 | 6 | 7 | 8 | 9 | 10 |
| Kind of polyhemiacetal ester resin | A-1 | A-2 | A-3 | A-4 | A-5 | A-6 | A-7 | A-8 |
| Raw material Components (weight parts) | | | | | | | | |
| 1,4-BD/HHPA[*1] | 50.6 | — | — | — | — | — | — | — |
| NPG/phthalic acid anhydride[*2] | — | 50.6 | — | — | — | — | — | — |
| CHDM[*3] | — | — | — | — | — | — | — | 20.0 |
| MHHPA[*4] | — | — | — | — | — | — | — | 48.0 |
| HTPA[*5] | — | — | 28.9 | 34.9 | 35.7 | — | — | — |
| maleic acid | — | — | — | — | — | 22.9 | — | — |
| isophthalic acid | — | — | — | — | — | — | 35.3 | — |
| adipic acid | — | — | — | — | — | — | — | — |
| CHDVE[*6] | 29.4 | 29.4 | 51.1 | 45.1 | 44.3 | 57.1 | — | 31.4 |
| TEGDVE[*7] | — | — | — | — | — | — | 44.7 | — |
| xylene | 20.0 | 20.0 | 20.0 | 20.0 | 20.0 | 20.0 | 20.0 | — |
| Nonvolatile matter (weight %) | 80.0 | 80.0 | 80.0 | 80.0 | 80.0 | 80.0 | 80.0 | 100.0 |
| Resin acid (mgKOH/g) | 4.8 | 4.7 | 1.6 | 4.4 | 9.8 | 2.5 | 9.6 | 9.5 |
| Weight average molecular weight (MW)[*8] | 4325 | 4720 | 995 | 3850 | 9830 | 1030 | 28751 | 8785 |
| Resin acid equivalent (g/mole) | 315 | 316 | 245 | 197 | 193 | 203 | 188 | 350 |

The components and the abbreviations in the Table mean the followings.
1,4-BD/HHPA[*1]: half-ester obtained by reacting 1,4-butanediol with hexahydrophthalic acid anhydride, that is, a-1 in Preparation Example 1
NPG/phthalic acid anhydride[*2]: half-ester obtained by reacting neopentyl glycol with phthalic acid anhydride, that is, a-2 in Preparation Example 2
CHDM[*3]: 1,4-cyclohexanedimethylol
MHHPA[*4]: 4-methyl hexahydrophthalic acid anhydride
HTPA[*5]: hexahydroterephthalic acid
CHDVE[*6]: 1,4-cyclohexanedimethanol divinyl ether
TEGDVE[*7]: triethylene glycol divinyl ether
Weight average molecular weight[*8]: It was determined in polystyrene molecular weight by gel permeation chromatography (GPC).

Examples 1 to 7

(1) Preparation of Thermosetting Composition

The thermosetting compositions were prepared by mixing the raw components shown in Table 3.

(2) Preparation of Test Pieces

The composition shown in Table 3 was applied by barcoater on an anodized aluminum plate ground with brush in an amount to form a film having dried thickness of 30 μm and the coated plate was prebaked at 80° C. for 30 minutes and was baked at 180° C. for 60 minutes. Thus, test pieces were prepared.

In Example 7, the coated plate after prebaking was crossly irradiated with a mercury lamp in 150 mJ/cm$^{-1}$ by using a ultraviolet ray irradiating device, TOSCURE 401 (trade name, produced by TOSHIBA LIGHTING & TECHNOLOGY CORPORATION), through the positive pattern. And then, the coated plate was dipped into an alkali developing liquid NMD-3 (trade name, produced by TOKYO OHKA KOGYO CO.,LTD.) at 25° C. for 60 seconds to develop and the pattern was baked at 180° C. for 60 minutes to prepare a test piece.

(3) Test of the properties of the cured films

Tests of the properties of the cured films were conducted by the following methods. The results were described in Table 3.

Acid Resistance

On a test piece, 2 ml of 40 weight % sulfuric acid was applied as spots and condition of the cured film was observed by visual comparison after standing for 48 hours at 20° C.

Impact Resistance Test

By using an impact deform tester (Japanese Industrial Standard Z-5400(1979), method of 6.13.3 B), a test piece was clamped to an impact frame of 6.35 mm radius and a weight of 500 g was dropped from the height of 40 cm on the test piece. Damage made on the coating film was observed by visual comparison.

Knoop Hardness Test

Measurement was made by using M type micro-hardness meter (manufactured by Shimazu Seisakusho, Ltd.) at 20° C. A larger value shows a higher hardness.

Storage Stability Test

The compositions prepared in Table 3 were diluted with xylene to the viscosity of 4 poise (measured by * Broockfield type viscometer at 20° C.) and stored in a sealed condition at 50° C. After the diluted compositions were stored for 30 days at 50° C., the viscosities were measured.

TABLE 3

| | Examples | | | | | | |
|---|---|---|---|---|---|---|---|
| | 1 | 2 | 3 | 4 | 5 | 6 | 7 |
| Polyhemiacetal ester resin (weight parts) | | | | | | | |
| A-1 | 62.6 | — | — | — | — | — | — |
| A-2 | — | 62.6 | — | — | — | — | — |
| A-3 | — | — | 56.2 | — | — | — | 56.2 |
| A-4 | — | — | — | 51.6 | — | — | — |
| A-5 | — | — | — | — | 51.2 | — | — |
| A-6 | — | — | — | — | — | 52.4 | — |
| EPICOAT 828(*1) (weight parts) | 33.2 | 33.2 | 39.6 | 44.1 | 44.6 | 43.3 | 39.6 |
| Equivalent ratio of blocked carboxyl group/epoxy group | 0.9/1.0 | 0.9/1.0 | 0.9/1.0 | 0.9/1.0 | 0.9/1.0 | 0.9/1.0 | 0.9/1.0 |
| Acid catalyst A(*2) (weight parts) | 4.2 | 4.2 | 4.2 | 4.3 | 4.2 | 4.3 | — |
| Acid catalyst B(*3) (weight parts) | — | — | — | — | — | — | 1.7 |
| Cured film properties | | | | | | | |
| Acid resistance | Non abnormal | Non abnormal | Non abnormal | Non abnormal | Non abnormal | Non abnormal | Non abnormal |
| Impact resistance | Non abnormal | Non abnormal | Non abnormal | Non abnormal | Non abnormal | Non abnormal | Non abnormal |
| Knoop hardness | 14.7 | 18.1 | 17.3 | 17.5 | 17.2 | 15.8 | 18.3 |
| Storage stability (50° C.) | | | | | | | |
| Initial viscosity (poise) | 4.0 | 4.0 | 4.0 | 4.0 | 4.0 | 4.0 | 4.0 |
| Viscosity after 30 days (poise) | 4.2 | 4.3 | 4.1 | 4.2 | 4.2 | 4.1 | 4.1 |

EPICOAT 828(*1): produced by YUKA SHELL EPOXY Kabushiki Kaisha, bisphenol A type epoxy resin
Acid catalyst A(*2): 10 percents by weight dimethylsulfoxide solution of a salt of zinc chloride and pyridine in same mole (solution in which pyridine salt of zinc chloride is diluted with dimethyl sulfoxide to be 10 percents by weight)
Acid catalyst B(*3): SANEID SI-80L (trade name, produced by SANSIHIN CHEMICAL INDUSTRIES CO., LTD.)

Results of the evaluation of cured film properties are shown in Table 3. In all cases, uniform cured films having good gloss were prepared. All the cured films had excellent acid resistance, impact resistance, hardness and storage stability. With respect to Example 7, the cured film had further excellent photographic sensitivity and definition.

Examples 8 to 10

Thermosetting Compositions in Combination of Epoxy Group and Other Reactive Functional Group The thermosetting compositions were prepared by using the polyhemiacetal ester resin of ingredient (A) and materials shown in Table 4, which had a combination of an epoxy group and other reactive functional group and were used as ingredient (B) that could react ingredient (A).

An alkylated aminomethylol group was contained in Example 8, an alkoxysilane group was contained in Example 9, and a blocked isocyanate group was contained in Example 10 as the reactive functional group of ingredient (B) other than an epoxy group.

On a hot-dip alloy zinc-coated steel plate having a thickness of 0.6 mm on which chromate treatment was applied, the thermosetting compositions is coated by a barcoater in an amount to form a film having thickness of 30 μm and the coated plate was baked at 80° C. for 10 minutes and was further baked at 180° C. for 30 minutes. Thus, test pieces were prepared. All tests of cured film appearance, pencil hardness, adhesion, impact resistance and solvent resistance were conducted to the obtained test pieces and results shown in Table 4 were obtained.

Also, evaluation of the stability was conducted by storing the thermosetting compositions at 30° C. for 1 month.

TABLE 4

| Example | | 8 | 9 | 10 |
|---|---|---|---|---|
| Formu-lation (weight parts) | Polyhemiacetal A-4 | 64.4 | 54.3 | — |
| | ester resin A-7 | — | — | 51.6 |
| | EPICOAT 828 | 24.7 | 20.8 | — |
| | EPOLEAD GT 401 (*1) | — | — | 33.3 |
| | CYMEL 303 (*2) | 8.5 | — | — |
| | KR-9202 (*3) | — | 22.2 | — |
| | DURANATE MF860X (*4) | — | — | 12.7 |
| | Zinc 2-ethyl hexylate | 2.4 | 2.7 | 2.4 |
| | Equivalent ratio of acid/reactive functional group | 1.0/1.0 | 1.0/1.0 | 1.0/1.0 |
| Cured film properties | Cured film appearance | Good | Good | Good |
| | Pencil hardness | 2H | HB | H |
| | Cross cut adhesion | 100/100 | 100/100 | 100/100 |
| | Impact resistance | Good | Good | Good |
| | Solvent resistance (*5) | Good | Good | Good |
| Storage stability | Viscosity change after 1 month at 30° C. | A little increasing | A little increasing | A little increasing |

(*1) trade name, a product of Daicel chemical Industries, LTD., alicyclic epoxy resin, epoxy equivalent 217 g/mole
(*2) trade name, a product of Mitsui Cytec Ltd., methyl etherificated melamine resin, etherificated aminomethylol group equivalent 65 g/mole
(*3) trade name, a product of Shin-Etsu chemical Co., Ltd., reactive silicone resin, alkoxy silane equivalent 202 g/mole
(*4) trade name, a product of Asahi chemical Industries Co., Ltd., methyl-ethyl ketoxime-blocked product of hexamethylene diisocyanate, blocked isocyanate equivalent 171 g/mole
(*5) An absorbent cotton soaked with acetone was rubbed by 20 times on the cured film and damage of the cured film was observed.

Example 11

Application to Adhesive for Laminated Film

An adhesive composition having an equivalent ratio of acid to epoxy of 0.6/1.0 was prepared by mixing 6.6 weight parts of polyhemiacetal ester resin A-8, 41.7 weight parts of EPICOAT #1007 (trade name, a product of YUKA SHELL EPOXY Kabushiki Kaisha, bisphenol A type epoxy resin, epoxy equivalent 1,750 to 2,200, softening point 144° C.), 2.2 weight parts of EPICOAT #157S70 (trade name, a product of YUKA SHELL EPOXY Kabushiki Kaisha, novolac type epoxy resin, epoxy equivalent 200 to 220, softening point 70° C.), 2.5 weight parts of acid catalyst C (a latent acid catalyst which was prepared by neutralizing zinc 2-ethyl hexylate with triethanolamine in the same equivalent), 0.3 weight parts of DISPALON L-1985-50 (trade name, a product of Kusumoto Chemicals Ltd., leveling agent) and 46.7 weight parts of cyclohexanone.

The adhesive compositions were respectively applied on a polyimide film having a thickness of 25 μm (UPILEX, trade name, a product of UBE Industries Ltd.) and on an electrolytic copper foil having a thickness of 35 μm in an amount to form a film having thickness of 10 μm and the coated plate was dried at 80° C. for 30 minutes.

The film and the foil applied with the adhesive, which was obtained in the above-mentioned process, became tack free and were not adhered by storage in roll.

The film and the foil applied with the adhesive were baked at 180° C. for 30 minutes. Cross cut adhesion test, solvent resistance test and pressure-cooker test (PCT, evaluation of moisture resistance in high temperature was made at 123° C., moisture 100% RH and for 96 hours) were conducted about the baked film and baked foil. All film and foil had excellent properties.

The film and the foil applied with the adhesive were heat pressed at 210° C. for 10 minutes on the each surfaces applied with the adhesives. Voids such as bubbling were not generated and a laminated film of copper and polyimide having excellent adhesion was obtained.

Examples 12 to 13

Application to Powder Thermosetting Composition

Raw material components shown in Table 5 were charged into a dry blender (trade name, "Henschel mixer", a product of Mitsui Kakoki Co., Ltd.) and mixed homogeneously for about 1 minutes. And then, the mixture was melt and kneaded in temperature condition of 80 to 120° C. by using an extruding and kneading machine (trade name, "Busskneader PR46", a product of Buss Co.,Ltd.) and was cooled and followed to pulverize by a hammer type impact mill. Next, the powder was filtrated by using a metal gauze of 180 mesh. A clear powder coating composition was prepared in Example 12 and an enamel powder coating composition was prepared in Example 13.

On a hot-dip alloy zinc-coated steel plate having a thickness of 0.6 mm on which chromate treatment was applied, the thermosetting compositions is coated by an electrostatic powder coating machine in an amount to form a film having thickness of 40 μm and the coated plate was baked at 160° C. for 30 minutes. Thus, test pieces were prepared. All tests of cured film appearance, pencil hardness, impact resistance and solvent resistance were conducted to the obtained test pieces and results shown in Table 6 were obtained.

TABLE 5

| | | Example 12 | Example 13 |
|---|---|---|---|
| Formu-lation (weight parts) | Polyhemiacetal ester resin A-8 | 34.8 | 23.5 |
| | FINE DIC A-247 S (*1) | 62.6 | 42.4 |
| | benzoin | 0.5 | 0.5 |
| | LEZIMIX (*2) | 0.5 | 0.5 |
| | Zinc 2-ethyl hexylate (acid catalyst) | 1.6 | 1.1 |
| | TYPURE R-960 (*3) | — | 30.0 |
| | EPICOAT 1002 (*4) | — | 2.0 |

TABLE 5-continued

|  | Example 12 | Example 13 |
|---|---|---|
| Total | 100.0 | 100.0 |
| Equivalent ratio of acid/epoxy group | 1.0 | 1.0 |

(*1) trade name, a product of Dainippon Ink & Chemicals, Incorporated, epoxy group-containing acrylic resin, epoxy equivalent 630 g/mole, resin softening point 109° C.
(*2) trade name, a product of Mitsui Chemical, Inc., leveling agent
(*3) trade name, a product of Du Pont Kabushiki Kaisha, titanium oxide
(*4) trade name, a product of Yuka Shell Epoxy Kabushiki Kaisha, bisphenol A type epoxy resin, epoxy equivalent 650 g/mole, resin softening point 78° C.

TABLE 6

|  | Example 12 | Example 13 |
|---|---|---|
| Cured film appearance ×1) | Good | Good |
| Pencil hardness | H | 2H |
| Impact resistance | Good | Good |
| Solvent resistance ×2) | Good | Good |
| Weathering resistance ×3) | Good | Good |

×1) Smoothness and distinctness of image of the cured films were evaluated by visual observation of pinhole generation by bubbling and the like in the cured film and distortion at projecting a fluorescent lamp on the cured film.
×2) An absorbent cotton soaked with acetone was rubbed by 20 times on the cured film and damage of the cured film was observed.
×3) By using a sunshine weatherometer (JIS B-7753), a test piece was exposed for 1,000 hours and then condition of the cured film was observed by visual.

The thermosetting composition of the present invention gives a cued product having excellent chemical properties, physical properties, adhesion, weathering resistance and smoothness and is particularly excellent in storage stability, because discharge amount of volatile materials was little out of the cured product system during curing.

What is claimed is:

1. A thermosetting composition which comprises:

(A) a polyhemiacetal ester resin having a repeat unit represented by formula (1):

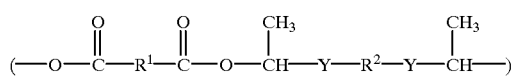

(1)

wherein $R^1$ and $R^2$ are a bivalent organic group, and Y is an oxygen atom or a sulfur atom, and (B) a compound having in the molecule two or more reactive functional groups which can form a chemical bond with the carboxyl group, and optionally, (C) an acid catalyst.

2. The thermosetting composition as claimed in claim 1, wherein the reactive functional group of ingredient (B) is at least one member selected from the groups consisting of epoxy group, oxazoline group, silanol group, alkoxysilane group, hydroxyl group, amino group, imino group, isocyanate group, blocked isocyanate group, cyclocarbonate group, vinyl ether group, vinyl thioether group, aminomethylol group, alkylated aminomethylol group, acetal group and ketal group.

3. The thermosetting composition as claimed in claim 1, wherein the acid catalyst of ingredient (C) is a thermal latent acid catalyst which is activated during curing of the composition by heating.

4. The thermosetting composition as claimed in claim 1, wherein the acid catalyst of ingredient (C) contains a compound which generate an acid by irradiating with light.

5. A powder thermosetting composition which comprises:

(A) a polyhemiacetal ester resin having a repeat unit represented by formula (1):

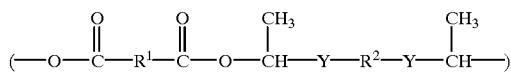

(1)

wherein $R^1$ and $R^2$ are a bivalent organic group, and Y is an oxygen atom or a sulfur atom, and (B) a compound having in the molecule two or more reactive functional groups which can form a chemical bond with the carboxyl group, and optionally, an acid catalyst.

6. The thermosetting composition as claimed in claim 5, wherein the reactive functional group of ingredient (B) is at least one member selected from the groups consisting of epoxy group, oxazoline group, silanol group, alkoxysilane group, hydroxyl group, amino group, imino group, isocyanate group, blocked isocyanate group, cyclocarbonate group, vinyl ether group, vinyl thioether group, aminomethylol group, alkylated aminomethylol group, acetal group and ketal group.

7. The thermosetting composition as claimed in claim 5, wherein the acid catalyst of ingredient (C) is a thermal latent acid catalyst which is activated during curing of the composition by heating.

8. The thermosetting composition as claimed in claim 5, wherein the acid catalyst of ingredient (C) contains a compound which generate an acid by irradiating with light.

* * * * *